(12) United States Patent
Kinugasa

(10) Patent No.: US 8,836,837 B2
(45) Date of Patent: Sep. 16, 2014

(54) PHOTOELECTRIC CONVERSION APPARATUS, FOCUS DETECTING APPARATUS, AND IMAGING SYSTEM

(75) Inventor: Tomohisa Kinugasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 13/478,830

(22) Filed: May 23, 2012

(65) Prior Publication Data

US 2013/0026349 A1 Jan. 31, 2013

(30) Foreign Application Priority Data

Jul. 27, 2011 (JP) .................................. 2011-164505

(51) Int. Cl.
| | |
|---|---|
| *H04N 5/335* | (2011.01) |
| *H04N 5/378* | (2011.01) |
| *H04N 5/3745* | (2011.01) |
| *H04N 5/232* | (2006.01) |
| *H04N 5/365* | (2011.01) |
| *H04N 5/363* | (2011.01) |

(52) U.S. Cl.
CPC ............ *H04N 5/23212* (2013.01); *H04N 5/365* (2013.01); *H04N 5/378* (2013.01); *H04N 5/363* (2013.01); *H04N 5/3745* (2013.01)
USPC ........................................ 348/308; 250/208.1

(58) Field of Classification Search
CPC . H01L 27/14609; H04N 3/1568; H04N 5/235

USPC ........ 250/208.1; 348/241, 294–308, 349, 364
See application file for complete search history.

(56) References Cited

U.S. PATENT DOCUMENTS

| | | | |
|---|---|---|---|
| 7,692,713 B2 | 4/2010 | Kinugasa et al. ............. | 348/350 |
| 2010/0079648 A1 | 4/2010 | Totsuka et al. ................ | 348/308 |
| 2011/0134272 A1* | 6/2011 | Kinugasa ................... | 348/222.1 |

FOREIGN PATENT DOCUMENTS

JP 9-200614 A 7/1997

* cited by examiner

*Primary Examiner* — Thanh Luu
*Assistant Examiner* — Renee D Chavez
(74) *Attorney, Agent, or Firm* — Fitzpatrick, Cella, Harper & Scinto

(57) ABSTRACT

A photoelectric conversion apparatus includes: a sensor cell unit for a non-inverting output, via a first non-inverting amplifier to a common output line, of a signal generated by a photoelectric conversion element; a first memory cell unit for holding the signal inputted from the common output line to a first memory capacitor, and for performing a non-inverting output of the signal held by the first memory capacitor, via a second non-inverting amplifier to the common output line; a transfer unit for non-inverting or inverting, via an amplifier, the signal in the common output line, and for outputting the signal non-inverted or inverted to the common output line; a transfer switch arranged between an input terminal of the transfer unit and the common output line; and a feedback switch arranged between an output terminal of the transfer unit and the common output line.

13 Claims, 10 Drawing Sheets

PHOTOELECTRIC CONVERSION APPARATUS, FOCUS DETECTING APPARATUS, AND IMAGING SYSTEM

BACKGROUND OF THE INVENTION

1. Field of the Invention

The present invention relates to a photoelectric conversion apparatus, a focus detecting apparatus, and an imaging system.

2. Description of the Related Art

An imaging system generally includes a focus detection (AF: Auto Focusing) sensor for detecting focus. Not only a large number of ranging points, but also highly-accurate, high-speed focus detection is demanded for the AF sensor of recent years. An area-type AF sensor is implemented as means for increasing the number of ranging points, in which a plurality of linear sensors forming the ranging points are arranged in parallel and connected by common wiring in a column direction. An example of a circuit configuration of the area-type AF sensor includes a solid-state imaging apparatus described in Japanese Patent Application Laid-Open No. H09-200614, the solid-state imaging apparatus including a transfer system for transferring a signal output from a sensor cell unit to a memory cell unit. A reset noise and a fixed pattern noise of the sensor need to be removed to increase the SN ratio of the sensor signal to improve the ranging accuracy of AF. In Japanese Patent Application Laid-Open No. H09-200614, the sensor cell unit and the memory cell unit have an inverting output function of signal to remove the fixed pattern noise of the sensor cell unit and the memory cell unit itself.

However, when the sensor cell unit and the memory cell unit have the inverting output function of signal as in Japanese Patent Application Laid-Open No. H09-200614, a tradeoff arises between the input/output linearity of signal and the circuit area. For example, a switched capacitor often used as an inverting output circuit includes a differential circuit and a feedback capacitor, and the circuit size is significantly large. The following three problems can be listed when a common-source inverting amplifier is used as in Japanese Patent Application Laid-Open No. H09-200614. Firstly, a semiconductor substrate bias effect degrades the linearity of an output signal. Secondly, the amplitude of an input signal changes the drive current of the inverting amplifier, and the consumption of current increases if the circuit responsiveness is improved. Thirdly, the relative variation of transistors varies the gains of inverting amplifiers, and the non-uniformity of output voltage is degraded.

SUMMARY OF THE INVENTION

According to an aspect of the present invention, there is provided a photoelectric conversion apparatus comprising: a sensor cell unit for performing a non-inverting output, via a first non-inverting amplifier to a common output line, of a signal generated according to a photoelectric conversion by a photoelectric conversion element; a first memory cell unit for holding the signal inputted from the common output line to a first memory capacitor, and for performing a non-inverting output of the signal held by the first memory capacitor, via a second non-inverting amplifier to the common output line; a transfer unit for non-inverting or inverting, via an amplifier, the signal in the common output line, and for outputting the signal non-inverted or inverted to the common output line; a transfer switch arranged between an input terminal of the transfer unit and the common output line; and a feedback switch arranged between an output terminal of the transfer unit and the common output line, wherein the sensor cell unit outputs the non-inverting output from the first non-inverting amplifier through a first switch to the common output line, the first memory cell unit inputs the signal from the common output line through a first memory cell write switch to the first memory capacitor, and outputs the non-inversion output from the second non-inverting amplifier through a second switch to the common output line.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
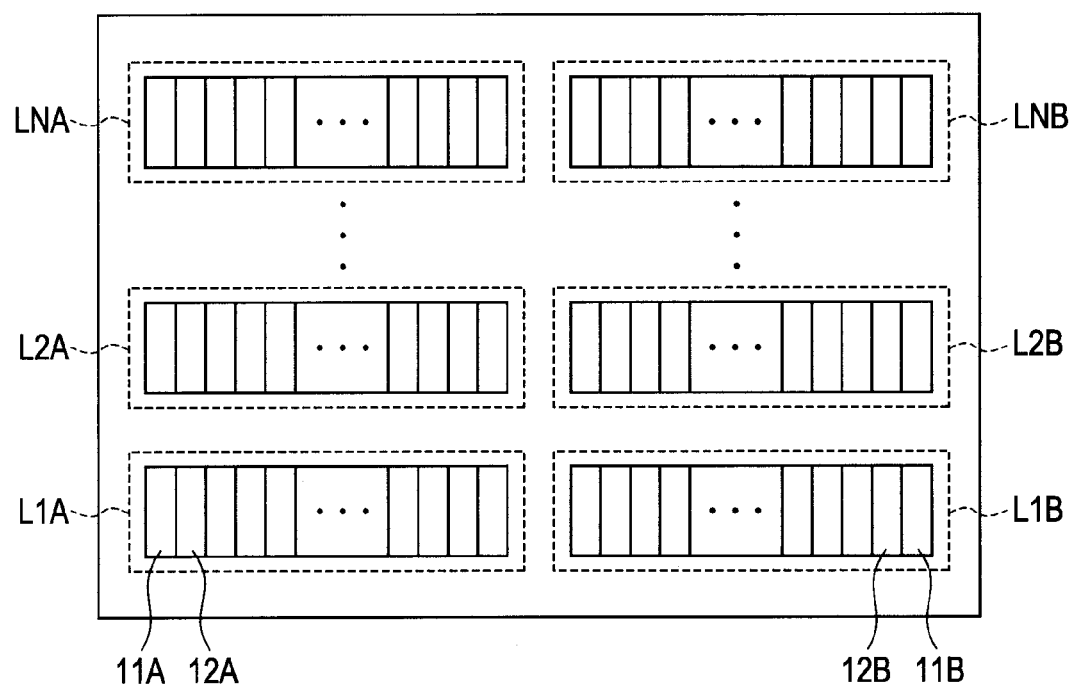
FIG. 1 is a schematic diagram of an imaging plane of a photoelectric conversion apparatus according to a first embodiment of the present invention.

A first embodiment of the present invention illustrates an example of application to a photoelectric conversion apparatus for phase difference based focus detection (AF: Auto Focusing). FIG. 1 is a diagram schematically illustrating an imaging plane in the photoelectric conversion apparatus for phase difference AF. The imaging plane includes pairs of line sensor units L1A and L1B, L2A and L2B, ... LNA and LNB. A pair of line sensor units is used to measure a defocusing amount of an object in an area of the imaging plane. A plurality of pairs of line sensor units is arranged to provide a plurality of ranging points to improve the accuracy of AF. A configuration with narrow arrangement intervals between pixel apertures of the line sensor units and with a two-dimensional array arrangement is called an area-type AF sensor. The line sensor units L1A, L2A, ..., LNA include a plurality of unit pixels 11A, 12A, ..., and the line sensor units L1B, L2B, ..., LNB include a plurality of unit pixels 11B, 12B, ....

Figure 2:
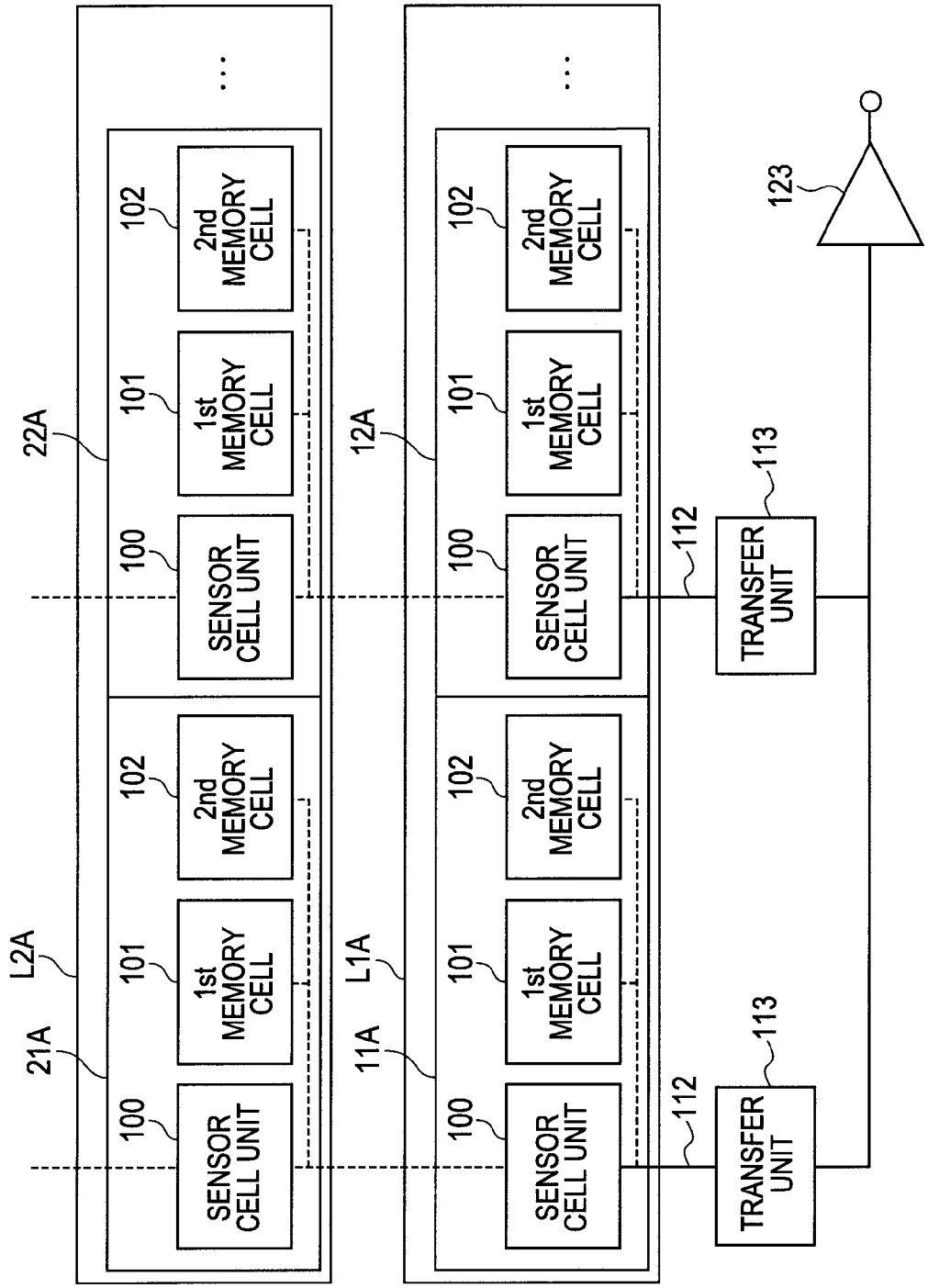
FIG. 2 is a block diagram of a line sensor unit according to the first embodiment of the present invention.

FIG. 2 is a block diagram illustrating the part of the line sensor units L1A, L2A, . . . in more detail. The line sensor unit L1A includes the unit pixels 11A, 12A, . . . . The line sensor unit L2A includes unit pixels 21A, 22A, . . . . Each of the unit pixels 11A, 12A, 21A, 22A, etc. has a sensor cell unit 100, a first memory cell unit 101, and a second memory cell unit 102. The sensor cell unit 100, the first memory cell unit 101, and the second memory cell unit 102 are connected to a transfer unit 113 through a common output line 112. The unit pixels 11A and 21A at positions in the same column of different line sensor units L1A and L2A are connected to a common transfer unit 113 through a common output line 112. Similarly, the unit pixels 12A and 22A at positions in the same column of different line sensor units L1A and L2A are connected to a common transfer unit 113 through a common output line 112. The transfer units 113 are connected to a common buffer amplifier 123. The line sensor units L1B, L2B, . . . also have the same configuration as in FIG. 2.

Figure 3:
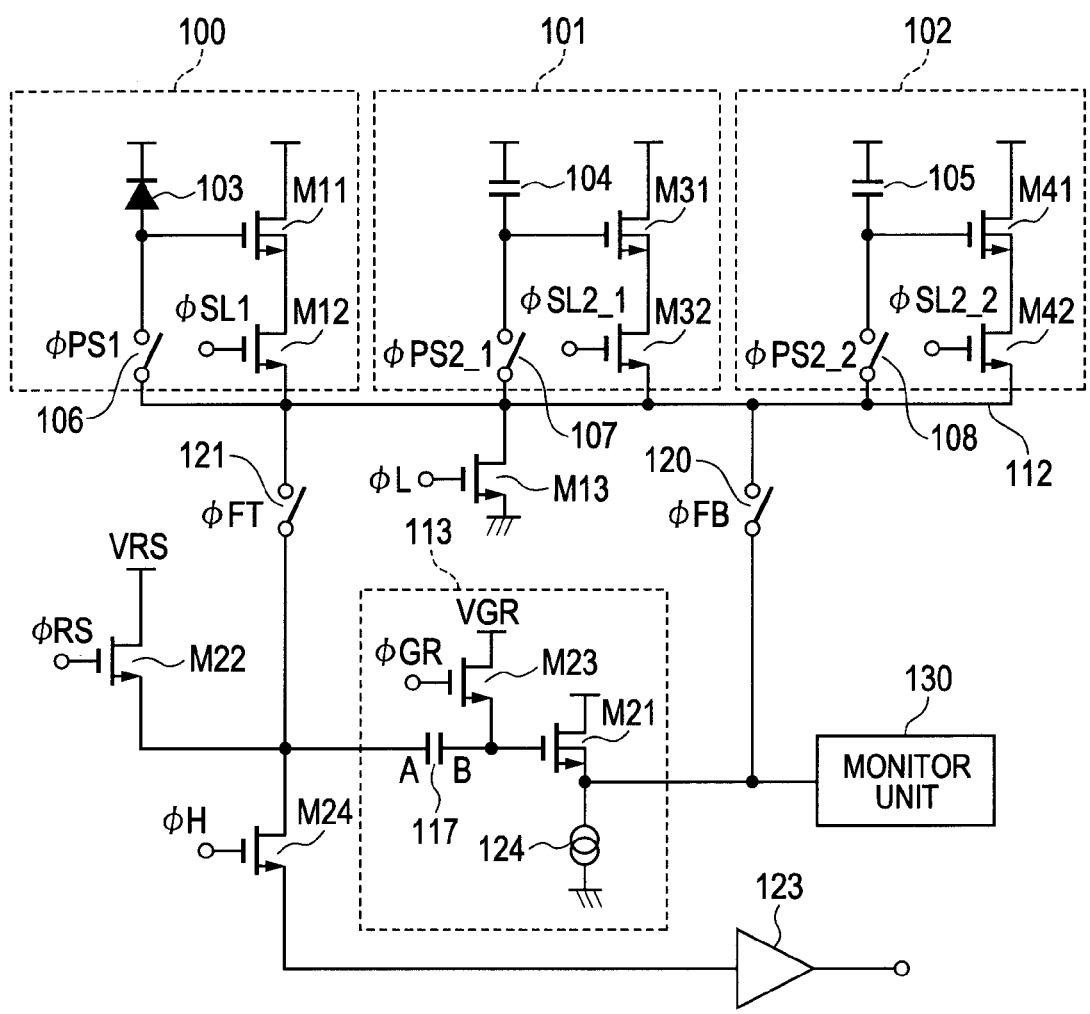
FIG. 3 is a circuit diagram of the photoelectric conversion apparatus according to the first embodiment of the present invention.

Part of the configuration illustrated in FIG. 2 is extracted in FIG. 3, and particularly, the unit pixel 11A and the transfer unit 113 connected to the unit pixel 11A will be focused and described. The unit pixel 11A includes the sensor cell unit 100, the first memory cell unit 101, and the second memory cell unit 102. In FIG. 3, "φ" attached to control electrodes and switches of MOS transistors denotes a signal supplied from a control unit not illustrated.

In the unit pixel 11A, the sensor cell unit 100 includes a photodiode (PD) 103 as a photoelectric conversion element, a sensor cell unit write switch 106, and transistors M11 and M12. An anode of the photodiode 103 is connected to one of the terminals of the sensor cell unit write switch 106 and to a control electrode of the transistor M11, and a cathode is connected to a power supply voltage node. Since the transistor M11 is connected by self biased, when the MOS transistor M12 is conducted, the transistor M11 and a load MOS transistor M13 form a self-biased source follower with a gain of 1, i.e. a non-inverting amplifier. An accumulated signal based on a charge amount generated according to a photoelectric conversion by the photodiode 103 is output to the common output line 112 through the source follower. Therefore, the MOS transistor M12 functions as a selection switch for selecting the sensor cell unit 100. The sensor cell unit write switch 106 switches conduction and non-conduction of the anode of the photodiode 103 and the common output line 112 and can include a PMOS transistor, an NMOS transistor, and a CMOS transistor. In the memory cell units 101 and 102, memory capacitors 104 and 105 replace the photodiode 103 of the sensor cell unit 100. In the first memory cell unit 101, transistors M31 and M32 and a switch 107 correspond to the transistors M11 and M12 and the switch 106 of the sensor cell unit 100, respectively. In the second memory cell unit 102, transistors M41 and M42 and a switch 108 correspond to the transistors M11 and M12 and the switch 106 of the sensor cell unit 100, respectively. The sensor cell unit 100 performs a non-inverting output of a signal generated according to a photoelectric conversion by the photoelectric conversion element 103 to the common output line 112 through the first non-inverting amplifier M11. The first memory cell unit 101 holds a signal inputted from the common output line 112 in the first memory capacitor 104 and performs a non-inverting output of the signal held in the first memory capacitor 104 to the common output line 112 through the second non-inverting amplifier M31. The second memory cell unit 102 holds a signal inputted from the common output line 112 in the second memory capacitor 105 and performs a non-inverting output of the signal held in the second memory capacitor 105 to the common output line 112 through the third non-inverting amplifier M41. The sensor cell unit 100 outputs a non-inverting output of the first non-inverting amplifier M11 to the common output line 112 through the first switch M12. The first memory cell unit 101 inputs the signal of the common output line 112 to the first memory capacitor 104 through the first memory cell unit write switch 107 and outputs the non-inverting output of the second non-inverting amplifier M31 to the common output line 112 through the second switch M32. The second memory cell unit 102 inputs the signal of the common output line 112 to the second memory capacitor 105 through the second memory cell unit write switch 108 and outputs the non-inverting output of the third non-inverting amplifier M41 to the common output line 112 through the third switch M42.

The transfer unit 113 will be described. The transfer unit 113 includes MOS transistors M21 and M23, a transfer capacitor 117, and a constant current source 124. The MOS transistor M21 and the constant current source 124 form a source follower. The common output line 112 is connected to a transfer switch 121 and a feedback switch 120. The other terminal of the transfer switch 121 is connected to a terminal A of the transfer capacitor 117, to one of the main electrodes of a MOS transistor M22, and to one of the main electrodes of a MOS transistor M24. The other main electrode of the MOS transistor M22 is connected to a node of a reference voltage VRS. The other main electrode of the MOS transistor M24 as an optical signal read switch is connected to the buffer amplifier 123. Another terminal B of the transfer capacitor 117 is connected to a control electrode of the MOS transistor M21 and to one of the main electrodes of the MOS transistor M23. One of the main electrodes of the MOS transistor M21 is connected to a node of a power supply voltage VDD, and the other main electrode is connected to the constant current source 124, to the other terminal of the feedback switch 120, and to a monitor unit 130 arranged outside of the sensor array. Based on operations described later, the transfer unit 113 executes (1) a process of inverting an output from the sensor cell unit 100 and (2) processing of a difference between a signal output from the sensor cell unit 100, a reset noise written in the memory cell units 101 and 102, and a noise generated by the transfer unit 113. The transfer unit 113 non-inverts or inverts the signal from the common output line 112 through the amplifier M21 and outputs the signal to the common output line 112. The transfer switch 121 is arranged between an input terminal of the transfer unit 113 and the common output line 112. The feedback switch 120 is arranged between an output terminal of the transfer unit 113 and the common output line 112.

Figure 4:
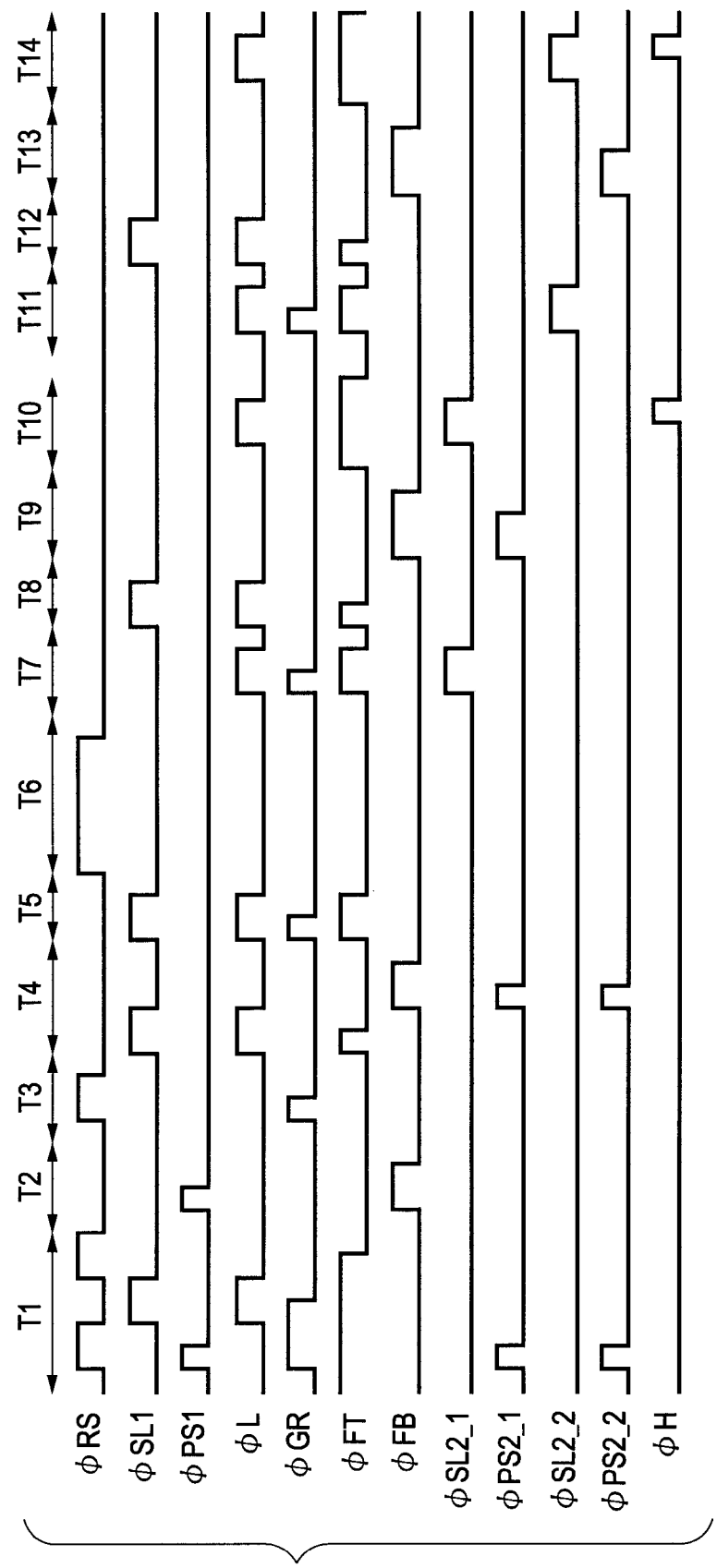
FIG. 4 is a timing diagram according to the first embodiment of the present invention.

FIG. 4 illustrates signals provided to the control electrodes of the switches and the MOS transistors illustrated in FIG. 3. An operation of the photoelectric conversion apparatus according to the present embodiment will be described with reference to FIGS. 3 and 4. The switches and the MOS transistors are conducted when the signals illustrated in FIG. 4 are at a high level. At the high level, a signal φL is set to a gate potential for the load MOS transistor M13 to drive a certain current.

In FIG. 4, an operation of resetting the photodiode 103 and the memory capacitors 104 and 105 is performed in a period T1. Subsequently, an operation of writing a fixed pattern noise Ns of the source follower of the sensor cell unit 100 in the transfer capacitor 117 is performed. Specifically, signals φRS, φFT, φPS1, φPS2_1, φPS2_2, and φGR are switched to the high level in the period T1. As a result, the sensor cell unit write switch 106, the memory cell unit write switches 107 and 108, the transfer switch 121, the MOS transistor M22, and the MOS transistor M23 are conducted. The MOS transistor M22 is a reset unit for resetting the input terminal A of the transfer unit 113 to the reference voltage VRS. As a result, the photodiode 103 and the memory capacitors 104 and 105 are reset to the reference voltage VRS. The terminal A of the transfer capacitor 117 is reset to the reference voltage VRS, and the terminal B is reset to a clamp voltage VGR. The potential of the clamp voltage VGR is set to VGR=VRS+Vth, which is a sum of the reference potential VRS and a threshold Vth of the self-biased source follower of the sensor cell unit 100, the memory cell units 101 and 102, or the transfer unit 113.

After the signals φPS1, φPS2_1, φPS2_2, and φRS are switched to a low level, signals φSL1 and φL are switched to the high level. Consequently, VRS−Vth+Ns, which is derived by adding the threshold Vth of the source follower of the sensor cell unit 100 and the fixed pattern noise Ns of the sensor cell unit 100 to the reset potential VRS, is written in the terminal A of the transfer capacitor 117. The terminal B of the transfer capacitor 117 floats when the signal φGR is switched to the low level. When the signal φFT is switched to the low level after the signal φRS is switched to the high level, the terminal A of the transfer capacitor 117 changes to the reference voltage VRS. Therefore, the potential of the terminal B is VGR+Vth−Ns=VRS+2×Vth−Ns. In this way, the transfer unit 113 is clamped by the output from the sensor cell unit 100 when the signals φSL1 and φFT are switched to the high level. After the clamp is released when the signal φGR is switched to the low level, the reference voltage VRS is input when the signal φRS is switched to the high level.

In a period T2, when a signal φFB is switched to the high level, a voltage VRS+Vth−NS+Nt, which is derived by superimposing the threshold Vth and the noise Nt of the source follower of the transfer unit 113 on the voltage VRS+2×Vth−Ns held in the terminal B of the transfer capacitor 117, is output to the common output line 112. In the period, the signal φPS1 is temporarily switched to the high level, and the voltage VRS+Vth−Ns+Nt is written in the sensor cell unit 100. An accumulating operation period of the sensor cell unit 100 starts when the signal φPS1 is switched to the low level. Therefore, the transfer unit 113 outputs the fixed pattern noise Ns of the sensor cell unit 100 and the noise Nt caused by the transfer unit 113 to the sensor cell unit 100 when the signals φPS1 and φFB are switched to the high level.

In a period T3, when the signals φRS and φGR are switched to the high level, the reference potential VRS is provided to the terminal A of the transfer capacitor 117, and the clamp voltage VGR (=VRS+Vth) is provided to the other terminal B. The terminal B of the transfer capacitor 117 floats when the signal φGR is switched to the low level. The transfer unit 113 is clamped at the reference voltage VRS when the signal φRS is switched to the high level, and the clamp is released when the signal φGR is switched to the low level.

In a period T4, when the signals φSL1, φL, and φFT are switched to the high level, the threshold voltage Vth and the fixed pattern noise Ns of the source follower of the memory cell units 101 and 102 are added to the voltage VRS+Vth−Ns+Nt held in the sensor cell unit 100 and output. Therefore, the output of the sensor cell unit 100 is a voltage VRS+Vth−Ns+Nt−Vth+Ns=VRS+Nt. At this point, the noise Ns of the sensor cell unit 100 is canceled. The potential of the terminal A of the transfer capacitor 117 is switched to VRS+Nt, and the potential changes by the amount of the noise Nt of the transfer unit. Therefore, the potential of the terminal B is switched to VRS+Vth+Nt. When the signal φFB is switched to the high level after the signal φFT is switched to the low level, a voltage VRS+2×Nt is output from the source follower of the transfer unit 113. Although not specified in the formula, in addition to the noise 2×Nt, a random noise (hereinafter, "reset noise") caused by the initialization of the sensor cell unit 100 in the period T1 is also superimposed. After releasing the clamp, the transfer unit 113 inputs the output from the sensor cell unit 100 when the signals φSL1 and φFT are switched to the high level and outputs the reset noise from the sensor cell unit 100 to the first memory cell unit 101 when the signals φPS2_1 and φFB are switched to the high level. The first memory cell unit 101 holds the reset noise of the sensor cell unit 100.

The signals φPS2_1 and φPS2_2 are both switched to the high level in the period T4. Therefore, the voltage VRS+2×Nt is also written at the same time in the memory cell units 101 and 102 through the switches 107 and 108. The same time denotes that the voltage VRS+2×Nt is written in both the memory cell units 101 and 102 based on the signals φPS2_1 and φPS2_2 when the signal φFB is in the high level in the period T4. The signals φPS2_1 and φPS2_2 may not be shifted to the low level at the same time.

In a period T5, the signals φSL, φL, and φFT are switched to the high level. Therefore, the source follower of the sensor cell unit 100 is activated, and a level corresponding to a signal S1 generated according to a photoelectric conversion by the sensor cell unit 100 emerges in the common output line 112. The voltage VRS+Vth−Ns+Nt is written in the sensor cell unit 100 in the operation up to the period T5. Therefore, the signal output from the sensor cell unit 100 and inputted to the terminal A of the transfer capacitor 117 is a voltage VRS+Nt+S1. The signal φGR is switched to the high level, and the terminal B is reset to the clamp voltage VGR (=VRS+Vth). The signals φFT and φGR are switched to the low level, and the terminals A and B of the transfer capacitor 117 float. In this way, the transfer unit 113 is clamped by the output from the sensor cell unit 100 when the signals φSL1 and φFT are switched to the high level, and the clamp is released when the signal φGR is switched to the low level.

An auto gain control (AGC) operation starts from a period T6. In the period, the signal φRS is switched to the high level, and the terminal A of the transfer capacitor 117 is fixed at the reference voltage VRS. Therefore, the potential of the terminal B of the transfer capacitor 117 is VRS+Vth−Nt−S1. A voltage VRS−S1, which is derived by adding the source follower threshold voltage Vth and the fixed pattern noise Nt of the transfer unit 113, is inputted to the monitor unit 130. Therefore, the monitor 130 can monitor only the optical signal S1 without the influence of noise. The monitor unit 130 observes the output of the sensor cell unit 100 in the period T6 in real time. The monitor unit 130 includes a gain-variable amplifier, and the gain is changed according to the detection result of the contrast described later. This will be called auto gain control (AGC). Periodical repetitions of the periods T5 and T6 allow the monitor unit 130 to monitor the status of the charge accumulation of the photodiode 103 in real time. As a result of the monitor operation by the monitor unit 130, an optical signal output from the sensor cell unit 100 at the end of the charge accumulating operation in the period T6 will be called an optical signal S2. In this way, after releasing the clamp, the transfer unit 113 inputs the reference voltage VRS when the signal φRS is switched to the high level and outputs the output voltage of the sensor cell unit 100 to the external monitor unit 130.

In a period T7, when signals φSL2_1, φL, φGR, and φFT are switched to the high level, a noise Nm1 of the first memory cell unit 101 is added to a noise 2Nt held in the first memory cell unit 101. Consequently, a voltage VRS−Vth+2Nt+Nm1 is provided to the terminal A of the transfer capacitor 117, and the potential of the terminal B is switched to the clamp voltage VGR (=VRS+Vth). The terminal B of the transfer capacitor 117 floats when the signal φGR is switched to the low level. In this way, the transfer unit 113 is clamped by the output from the first memory cell unit 101 when the signals φSL2_1 and φFT are switched to the high level, and the clamp is released when the signal φGR is switched to the low level.

In a period T8, a voltage VRS+S2+Nt is inputted to the terminal A of the transfer capacitor 117 when the signals φFT, φSL1, and φL are switched to the high level, and a voltage VRS+2Vth+S2−Nt−Nm emerges at the terminal B of the transfer capacitor 117. In this way, after releasing the clamp, the transfer unit 113 inputs the output from the sensor cell unit 100 when the signals φSL1 and φFT are switched to the high level.

In a period T9, the signal φFT is switched to the low level. If the signal φPS2_1 is switched to the high level when the signal φFB is at the high level, the threshold Vth and the noise Nt of the transfer unit 113 are added from the transfer unit 113, and a voltage VRS+Vth+S2−Nm1 is provided to the first memory cell unit 101. In this way, the transfer unit 113 outputs the voltage, which is derived by removing the reset noise held in the first memory cell unit 101 from the output voltage of the sensor cell unit 100, to the first memory cell unit 101 when the signals φPS2_1 and φFB are switched to the high level.

In a period T10, the signal φFB is switched to the low level, and the signal φFT is switched to the high level. In the period, the voltage VRS+Vth+S2−Nm1 held in the first memory cell unit 101 is output when the signals φL and φSL2_1 are switched to the high level. The threshold Vth and the noise Nm1 of the first memory cell unit 101 are added, and a voltage VRS+S2 is provided to the terminal A of the transfer capacitor 117. As a result, a signal with reduced influence of noise is output. If a signal φH is supplied from a shift register not illustrated in the period, the signal S2 is transmitted to the buffer amplifier 123 and output to a signal processing circuit of a later stage not illustrated.

In an operation in periods T11 to T14, the operation in the periods T7 to T10 is performed for the second memory cell unit 102. As a result, signals based on different charge accumulating times can be acquired from the sensor cell unit 100 in one charge accumulating sequence. In this way, a plurality of ranging points can be arranged in the same line within one charge accumulating sequence. Therefore, the number of ranging points can be increased, and a high-speed focus detection operation can be realized.

As described, the following two points are distinctive in the present embodiment. Firstly, the output of the sensor cell unit 100 and the memory cell units 101 and 102 is changed from the inverting output of Japanese Patent Application Laid-Open No. H09-200614 to the non-inverting output of the self-biased source follower. Secondly, the transfer unit 113 performs the clamp operation so that the fixed pattern noise generated by the sensor cell unit 100, the memory cell units 101 and 102, and the transfer unit 113 can be removed even with the non-inverting output of the sensor cell unit 100 and the memory cell units 101 and 102.

Realization of both the reduced layout and the output characteristics is difficult in the inverting amplifier used in Japanese Patent Application Laid-Open No. H09-200614. More specifically, the use of the switched capacitor including the differential amplifier and the feedback capacitor increases the layout area. The pixel aperture position on the AF sensor is limited by the ranging point arrangement on the finder depending on the optical system. Therefore, the ranging points cannot be densely arranged if the layout of the inverting amplifier is large, and this causes degradation in the AF characteristics. The common-source inverting amplifier used in Japanese Patent Application Laid-Open No. H09-200614 can be implemented with a smaller area than the switched capacitor. However, the linearity of output is degraded in the common-source inverting amplifier due to the substrate bias effect. The drive current largely changes according to the input of the inverting amplifier, and realization of both the power saving of sensor and the circuit responsiveness is difficult. Furthermore, the relative variation in the transistors of the inverting amplifiers tends to change the gain of output to degrade the photo response non-uniformity (PRNU).

On the other hand, the use of the non-inverting output of the self-biased source follower as in the present embodiment has advantages of excellent linearity, stable drive current, and less influence of the relative variation on the photo response non-uniformity (PRNU), compared to the common-source inverting amplifier. As a result, high accuracy and high speed can be realized even if the number of ranging points of the auto focus is increased in the area-type AF sensor. Although two memory cell units are arranged in the example described in the present embodiment, the number of memory cell units may be one, or three or more. If the number of memory cell units is three or more, operations corresponding to the operation of the periods T7 to T10 are also performed for the additional memory cell units.

Figure 5:
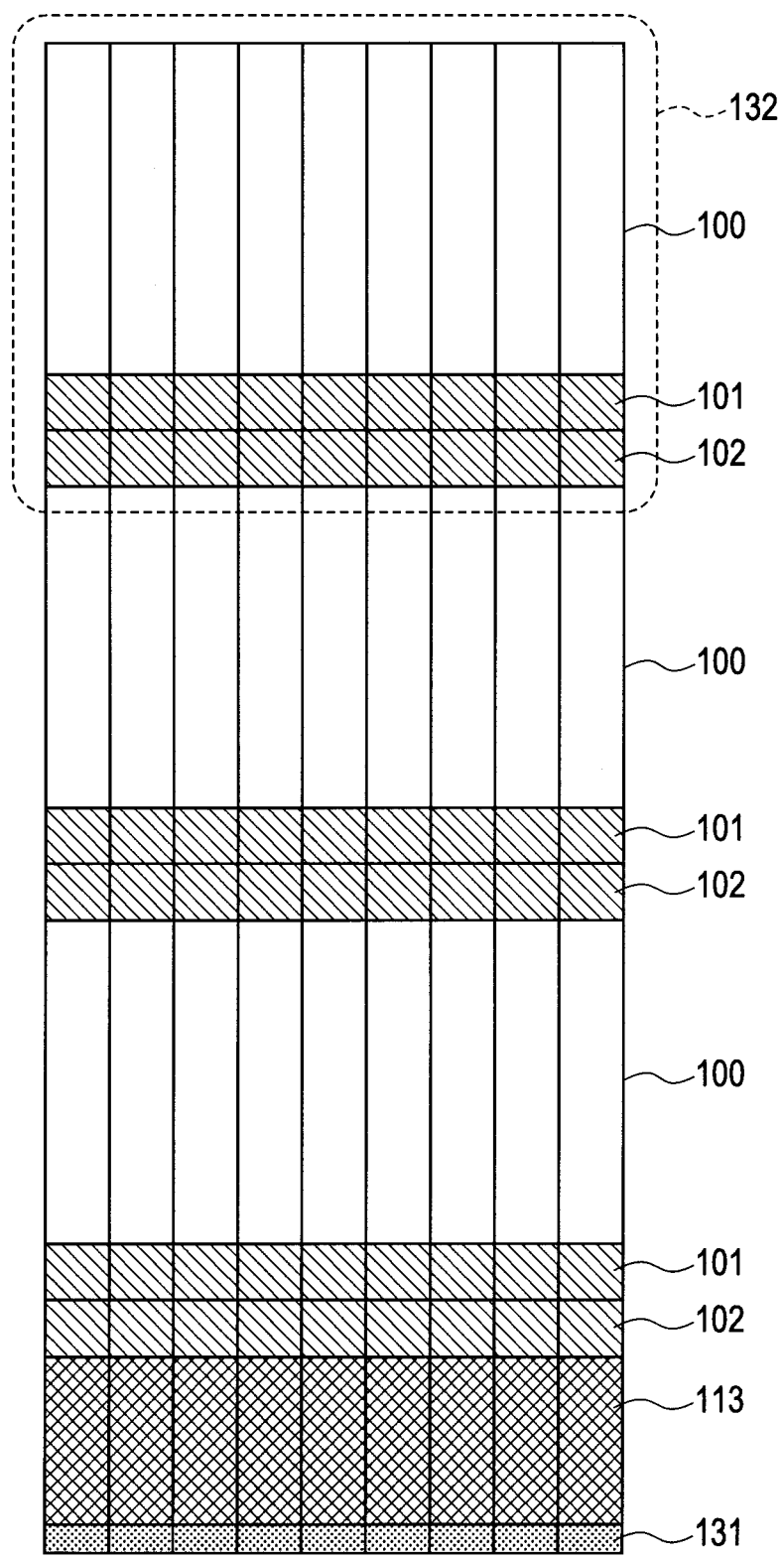
FIG. 5 is a first layout diagram of the photoelectric conversion apparatus according to the first embodiment of the present invention.
Figure 6:
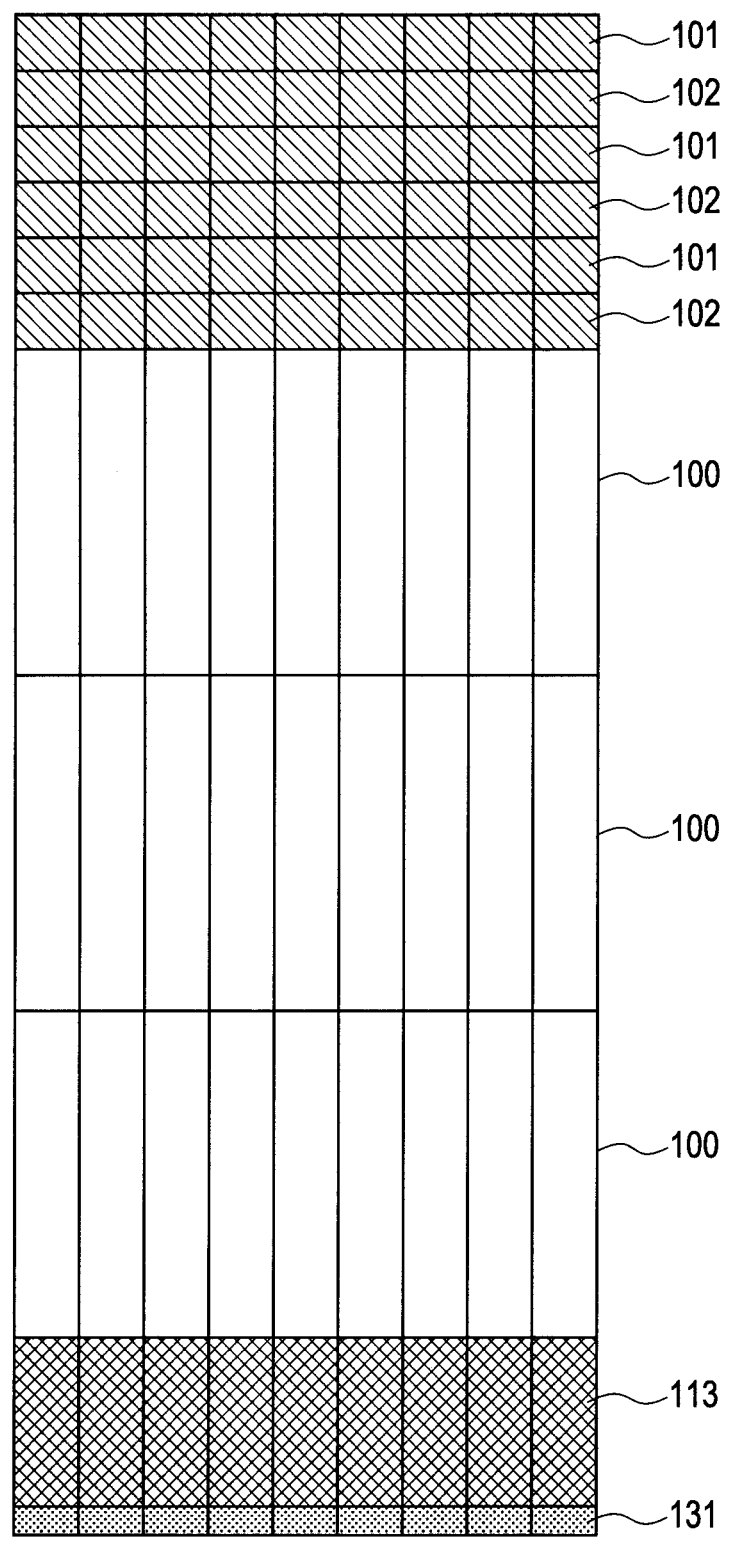
FIG. 6 is a second layout diagram of the photoelectric conversion apparatus according to the first embodiment of the present invention.

FIGS. 5 and 6 illustrate examples of layout of the photoelectric conversion apparatus illustrated in FIG. 3. FIG. 5 includes a set 132 of the sensor cell units 100, the first memory cell units 101, and the second memory cell units 102, and the set 132 is arranged in columns. The transfer units 113 and the shift registers 131 are commonly arranged for the plurality of sensor cell units 100 and memory cell units 101 and 102 arranged in columns.

FIG. 6 is a diagram of a layout including areas where only the sensor cell units 100 are arranged and areas where only the memory cell units 101 and 102 are arranged. In the layout, the transfer units 113 and the shift registers 131 are also commonly arranged for the plurality of sensor cell units 100 and memory cell units 101 and 102 arranged in columns.

Second Embodiment

Figure 7:
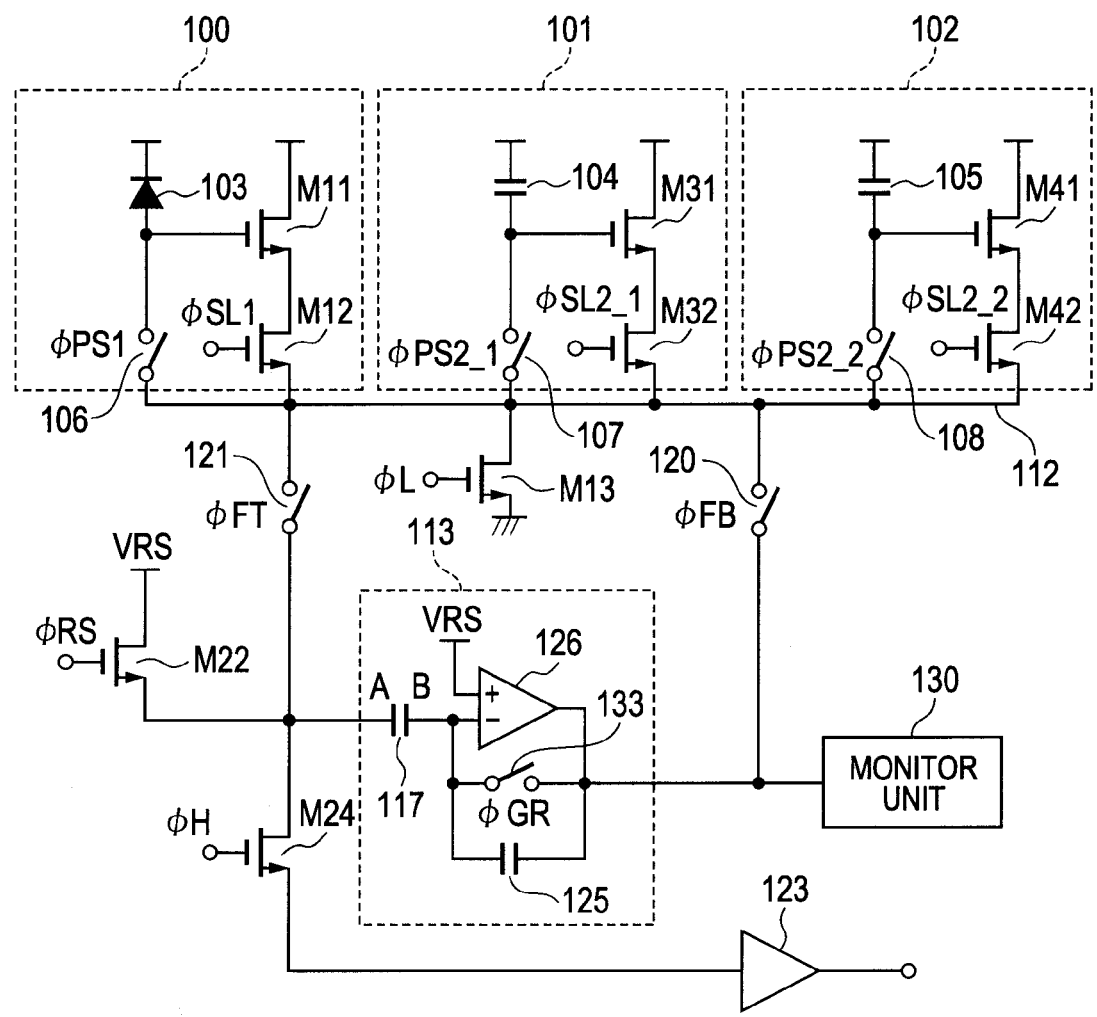
FIG. 7 is a circuit diagram of the photoelectric conversion apparatus according to a second embodiment of the present invention.
Figure 8:
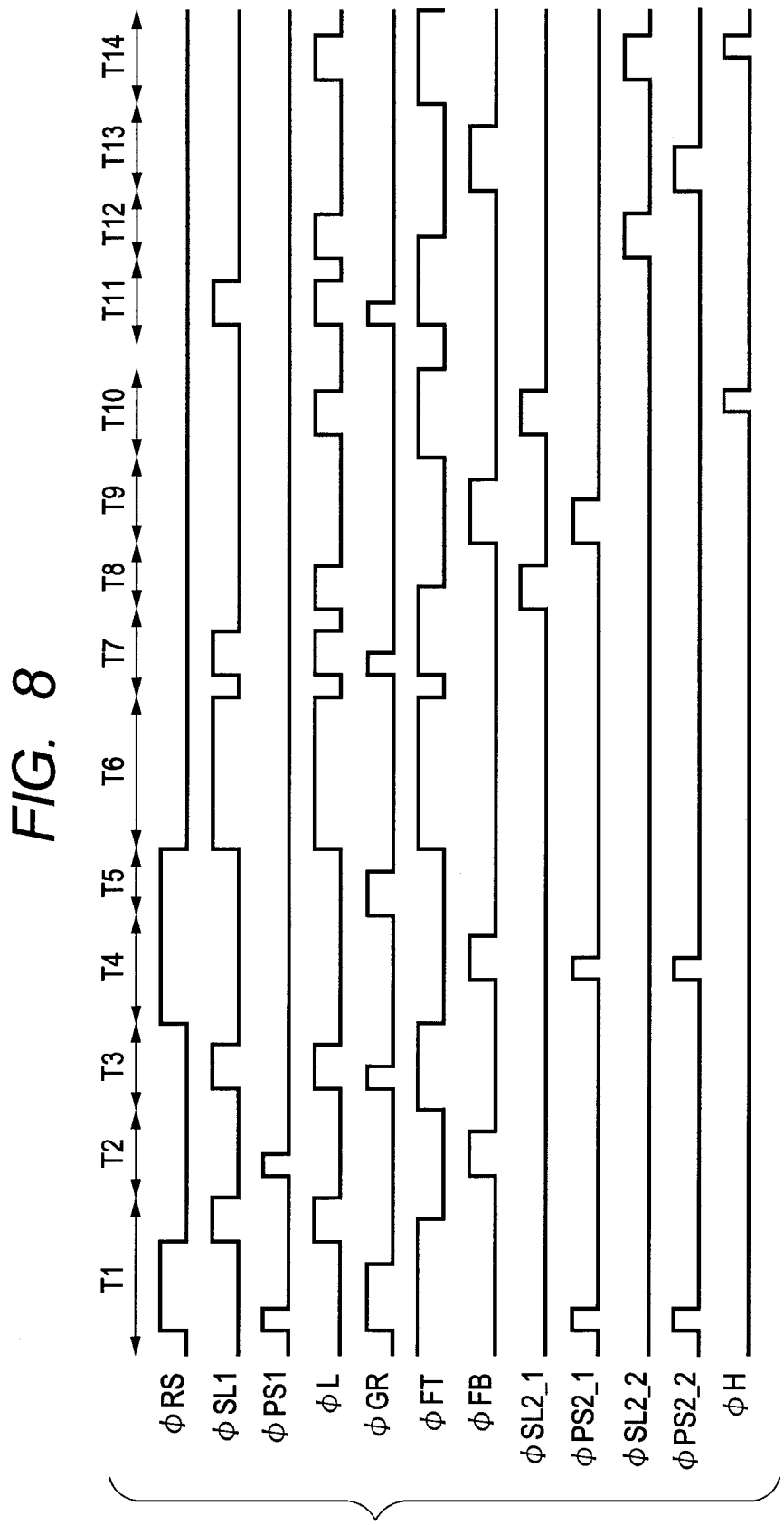
FIG. 8 is a timing diagram according to the second embodiment of the present invention.

An operation of the photoelectric conversion apparatus according to a second embodiment of the present invention will be described with reference to FIGS. 7 and 8. FIG. 7 is a circuit diagram of the photoelectric conversion apparatus according to the second embodiment of the present invention, and FIG. 8 is a timing diagram according to the second embodiment of the present invention. In FIG. 7, the common part as in FIG. 3 will not be described. The output amplifiers of the sensor cell unit 100 and the memory cell units 101 and 102 of FIG. 7 are non-self-biased source follower transistors M11, M31, and M41, and the gain is Gsf. The transfer unit 113 includes a differential amplifier 126, a feedback capacitor 125, and the transfer capacitor 117. The transfer capacitor 117 and the feedback capacitor 125 form a feedback system. The gain of the feedback system is a reciprocal 1/Gsf of the gain Gsf of the source followers. In the present embodiment, the non-inverting input terminal of the differential amplifier 126 is connected to the node of the reference voltage VRS. Hereinafter, Vth denotes a threshold voltage of the non-self-biased source followers of the sensor cell unit 100 and the memory cell units 101 and 102.

In the period T1, an operation of resetting the photodiode 103 and the memory capacitors 104 and 105 is performed. Subsequently, an operation of writing the fixed pattern noise Ns of the output amplifier of the sensor cell unit 100 in the transfer capacitor 117 is performed. Specifically, the signals φRS, φFT, φPS1, φPS2_1, φPS2_2, and φGR are first switched to the high level. As a result, the sensor cell unit write switch 106, the memory cell unit write switches 107 and 108, the transfer switch 121, the MOS transistor M22, and a switch 133 are conducted. In this way, the photodiode 103 and the memory capacitors 104 and 105 are reset to the reference voltage VRS, and both electrodes of the transfer capacitor 117 are reset to a potential derived by adding the output offset noise Nt of the differential amplifier 126 to the reference voltage VRS. Both electrodes of the feedback capacitor 125 are reset by the voltage VRS+Nt. In this way, the transfer unit 113 is clamped by the reference voltage VRS when the signal φRS is switched to the high level.

The terminal B of the transfer capacitor 117 floats when the signal φGR is switched to the low level. The signals φSL1 and φL are switched to the high level after the signals φPS1, φPS2_1, φPS2_2, and φRS are switched to the low level. Consequently, the potential VRS−Vth+Ns, which is derived by applying the gain of the source follower, the threshold Vth, and the fixed pattern noise Ns from the sensor cell unit 100, is written in the terminal A of the transfer capacitor 117. In this way, the transfer unit 113 releases the clamp when the signal φGR is switched to the low level and then inputs the output from the sensor cell unit 100 when the signals φSL1 and φFT are switched to the high level.

In the period T2, when the signal φFB is switched to the high level, a gain −1/Gsf of the transfer unit 113 is applied to a variation −Vth+Ns of the terminal B of the transfer capacitor 117. The noise Nt of the transfer unit 113 is further superimposed, and a voltage VRS+(Vth−Ns)/Gsf+Nt is output to the common output line 112. The signal φPS1 is temporarily switched to the high level in the period, and the voltage VRS+(Vth−Ns)/Gsf+Nt is written in the sensor cell unit 100. The period of the charge accumulating operation by the sensor cell unit 100 starts when the signal φPS1 is switched to the low level. In this way, when the signals φPS1 and φFB are switched to the high level, the transfer unit 113 outputs the noise, which is derived by adding the gain of the sensor cell unit 100 to the fixed pattern noise Ns of the sensor cell unit 100, and the noise Nt caused by the transfer unit 113 to the sensor cell unit 100.

In the period T3, when the signals φSL1 and φL are switched to the high level, the gain Gsf is applied to the voltage VRS+(Vth−Ns)/Gsf+Nt held in the sensor cell unit 100, and the fixed pattern noise Ns is applied before the voltage is output. Therefore, the output of the sensor cell unit 100 is a voltage VRS+Gsf×Nt. At this point, the noise Ns of the sensor cell unit 100 is canceled. When the signals φGR and φFT are switched to the high level, the voltage is provided to the terminal A of the transfer capacitor 117, and the voltage VRS+Nt is provided to the terminal B. The terminal B of the transfer capacitor 117 floats when the signal φGR is switched to the lower level. In this way, the transfer unit 113 is clamped by the output from the sensor cell unit 100 when the signals φSL1 and φFT are switched to the high level, and the clamp is released when the signal φGR is switched to the low level.

In the period T4, when the signal φRS is switched to the high level, the voltage of the terminal A of the transfer capacitor 117 is switched to the reference voltage VRS. The signal φFB is at the high level, and the voltage VRS+2×Nt is output from the output terminal of the transfer unit 113. Although not specified in the formula, in addition to the noise 2×Nt, a random noise (hereinafter, "reset noise") generated by initializing the sensor cell unit 100 in the period T1 is also superimposed.

In the period T4, the signals φPS2_1 and φPS2_2 are both at the high level. Therefore, the voltage VRS+2×Nt is also written at the same time in the memory cell units 101 and 102 through the switches 107 and 108. The same time denotes writing in both the memory cell units 101 and 102 based on the signals φPS2_1 and φPS2_2 in the period T4 when the signals φRS and φFB are at the high level. The signals φPS2_1 and φPS2_2 may not be shifted to the low level at the same time. In this way, after releasing the clamp, the transfer unit 113 inputs the reference voltage VRS when the signal φRS is switched to the high level and outputs the reset noise of the sensor cell unit 100 to the first memory cell unit 101 when the signals φPS2_1 and φFB are switched to the high level. The first memory cell unit 101 holds the reset noise of the sensor cell unit 100.

In the period T5, the signal φFT is at the high level. When the signals φRS and φGR are switched to the high level in the period T5, the terminal A of the common output line 112 and the transfer capacitor 117 is switched to the reference voltage VRS, and the terminal B is switched to the voltage VRS+Nt. The terminal B of the transfer capacitor 117 floats when the signals φRS and φGR are switched to the low level. In this way, the transfer unit 113 is clamped by the reference voltage VRS when the signal φRS is switched to the high level, and the clamp is released when the signal φGR is switched to the low level.

The AGC operation starts from the period T6. The signals φSL1 and φL are switched to the high level in the period. Therefore, the source follower of the sensor cell unit 100 operates, and a level corresponding to the signal S1 generated according to a photoelectric conversion by the sensor cell unit 100 emerges on the common output line 112. The voltage VRS+(Vth−Ns)/Gsf+Nt is written in the sensor cell unit 100 in the operation up to the period T5. Therefore, the signal output from the sensor cell unit 100 is a voltage VRS+Gsf×(Nt+S1). As a result, the terminal B of the transfer capacitor 117 is changed by the amount of the potential Gsf×(Nt+S1), and the output of the transfer unit 113 is the voltage VRS−S1. More specifically, the monitor unit 130 can monitor only an optical signal −S1 without the influence of noise. In this way, the monitor unit 130 observes the change in the output from the sensor cell unit 100 in the period T6 in real time. The monitor unit 130 includes the gain-variable amplifier, and the gain is changed according to the detection result of the contrast described later. This will be called auto gain control (AGC). As a result of the monitor operation by the monitor unit 130, an optical signal output from the sensor cell unit 101 at the end of the charge accumulating operation in the period T6 will be called an optical signal −S2. In this way, after releasing the clamp, the transfer unit 113 inputs the output from the sensor cell unit 100 when the signals φSL1 and φFT are switched to the high level and outputs the output voltage from the sensor cell unit 100 to the monitor unit 130.

In the period T7, the signals φFT, φSL1, φL, and φGR are switched to the high level. The terminal A of the transfer capacitor 117 is switched to a voltage VRS+Gsf×(Nt+S2), and the terminal B is switched to the voltage VRS+Nt. Therefore, the transfer unit 113 is clamped by the output from the sensor cell unit 100 when the signals φSL1 and φFT are switched to the high level, and the clamp is released when the signal φGR is switched to the low level.

In the period T8, the signals φSL2_1 and φL are switched to the high level. Consequently, the noise Nm1 of the first memory cell unit 101 is added to the voltage VRS+2×Nt held in the first memory cell unit 101, and a voltage VRS+Gsf×2×Nt−Vth+Nm1 is provided to the terminal A of the transfer capacitor 117. Therefore, the terminal B of the transfer capacitor 117 is switched to a potential Gsf×(Nt−S2)−Vth+Nm1. In this way, after releasing the clamp, the transfer unit 113 inputs the output from the first memory cell unit 101 when the signals φSL2_1 and φFT are switched to the high level.

In the period T9, the signal φFT is switched to the low level. If the signal φPS2_1 is switched to the high level when the signal φFB is at the high level, the transfer unit 113 provides a voltage VRS+(Vth−Nm1)×1/Gsf+S2 to the first memory cell unit 101. Therefore, when the signals φPS2_1 and φFB are switched to the high level, the transfer unit 113 outputs the voltage, which is derived by removing the reset noise held in the first memory cell unit 101 from the output voltage of the sensor cell unit 100, to the first memory cell unit 101.

In the period T10, the signal φFB is switched to the low level, and the signal φFT is switched to the high level. The signals φL and φSL2_1 are switched to the high level in the period. As a result, the gain Gsf and the noise Nm1 of the first memory cell unit 101 are added to the voltage VRS+(Vth−Nm1)×1/Gsf+S2 held in the first memory cell unit 101, and a voltage VRS+Gsf×S2 is provided to the terminal A of the transfer capacitor 117. As a result, a signal without the influence of noise is output. When the signal φH is supplied from a shift register not illustrated in the period, the signal S2×Gsf is transmitted to the buffer amplifier 123 and output to a signal processing circuit not illustrated in a later stage.

The operation of the periods T7 to T10 is performed for the second memory cell unit 102 in the operation in the periods T11 to T14. As a result, signals based on different charge accumulating times can be acquired from the sensor cell unit 100 in one charge accumulating sequence. In this way, a plurality of ranging points can be arranged in the same line within one charge accumulating sequence. Therefore, an increase in the number of ranging points and a high-speed focus detection operation can be realized.

As described, the following three points are distinctive in the present embodiment compared to the first embodiment. Firstly, the self-biased source followers of the first embodiment are changed to the non-self-biased source followers for the outputs from the sensor cell unit 100 and the memory cell units 101 and 102. Secondly, the transfer unit 113 includes the switched capacitor amplifier including the feedback system of the differential amplifier 126 and the feedback capacitor 125. Thirdly, the clamp timing of the transfer capacitor 117 is changed.

In the present embodiment, the use of the non-self-biased source followers can reduce the area occupied by the source followers in the sensor cell unit 100 and the memory cell units 101 and 102. Since the output of the source follower is reduced by the amount of the gain Gsf (usually, <×1), the transfer unit 113 with relatively large room includes the inverting amplifier with the gain −1/Gsf. The drive timing is changed to allow removing the fixed pattern noise of the sensor cell unit 100, the memory cell units 101 and 102, and the transfer unit 113. The buffer amplifier 123 of FIG. 7 can apply enough gain to prevent the reduction in the SN ratio caused by circuit noise in a later stage. The present embodiment implements the configuration and the drive method to increase the pixel aperture area of the sensor cell unit 100 compared to the first embodiment. Therefore, the sensitivity of the sensor can be improved. The memory capacitors 104 and 105 of the memory cell units 101 and 102 can be enlarged. Therefore, the switch noise can be reduced, and the SN ratio can be improved.

Third Embodiment

Figure 9:
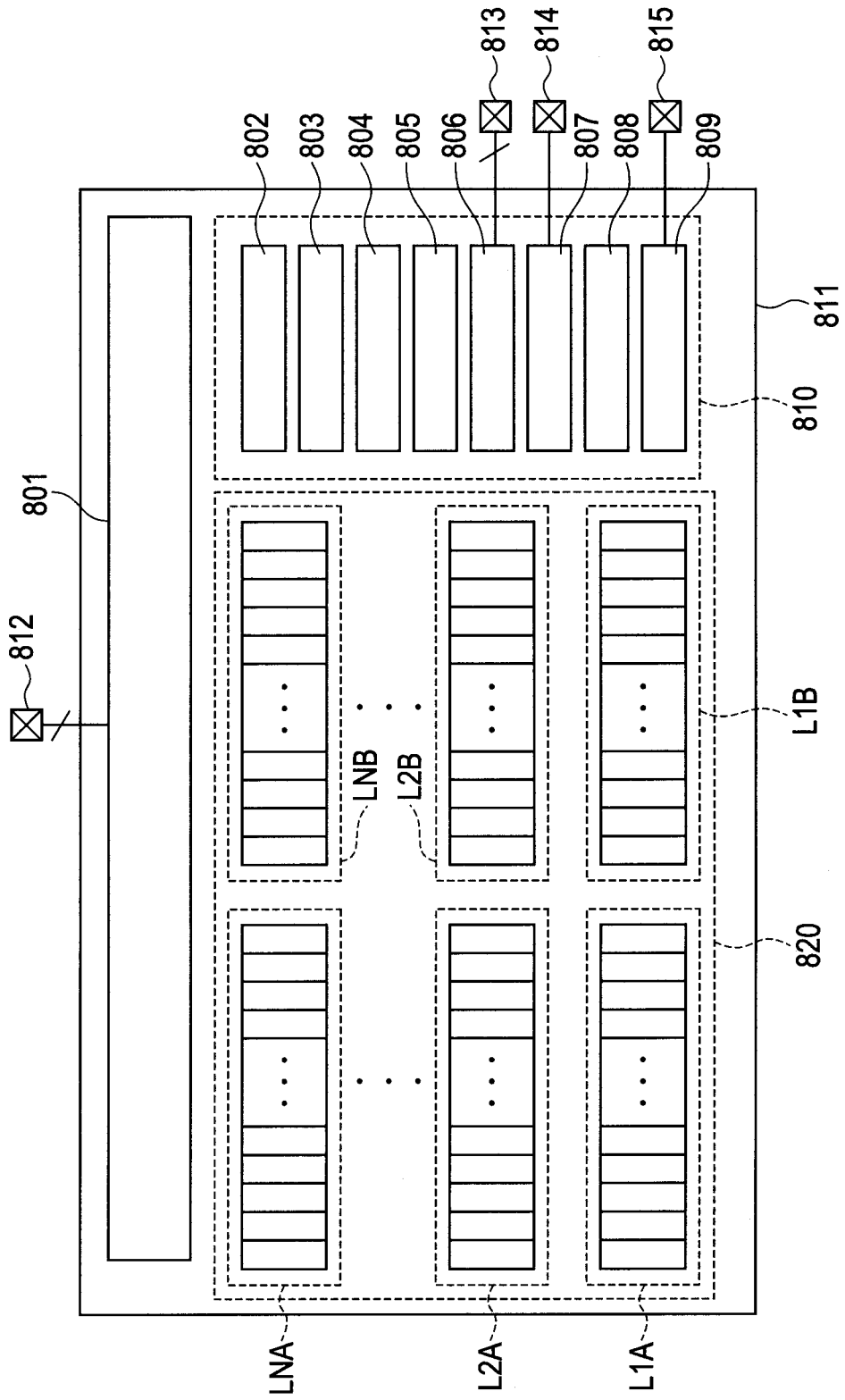
FIG. 9 is a block diagram of a focus detecting apparatus according to a third embodiment of the present invention.

A focus detecting apparatus according to a third embodiment of the present invention will be described with reference to FIG. 9. FIG. 9 is a block diagram illustrating an example of configuration of the third embodiment applying the photoelectric conversion apparatus according to the first or second embodiment to the focus detection apparatus (hereinafter, "AF sensor") of a phase difference detection system. An AF sensor 811 includes a sensor block 820, a logic block 801 with a function of generating a timing signal of an external interface and the AF sensor, and an analog circuit block 810. Line sensor units L1A, L2A, . . . and L1B, L2B, . . . are arranged in the sensor block 820. The analog circuit block 810 includes AGC circuits 802 to 805 to monitor signals from the line sensor units and to control charge accumulating time. A plurality of line sensor units correspond to one of the AGC circuits 802 to 805. Although four AGC circuits 802 to 805 are included in the present embodiment, the number of AGC circuits can be optimized from the viewpoint of circuit size and charge accumulation processing speed. The analog circuit block 810 further includes: a reference voltage current generation circuit 806 that generates a reference voltage and a reference current used by the photoelectric conversion apparatus; and a thermometer circuit 807. Reference numerals 813 and 814 denote external communication terminals. The logic block 801 controls the drive timing of the AF sensor 811 based on serial communication with the outside through a serial communication terminal 812. An AF gain circuit 808 applies a gain to the signal of the line sensor unit, and the signal is extracted from an analog signal output terminal 815 through an output multiplexer 809. In the present embodiment, the photoelectric conversion apparatus described in the first or second embodiment can be used to realize a high-speed, highly-accurate focus detection operation.

Fourth Embodiment

Figure 10:
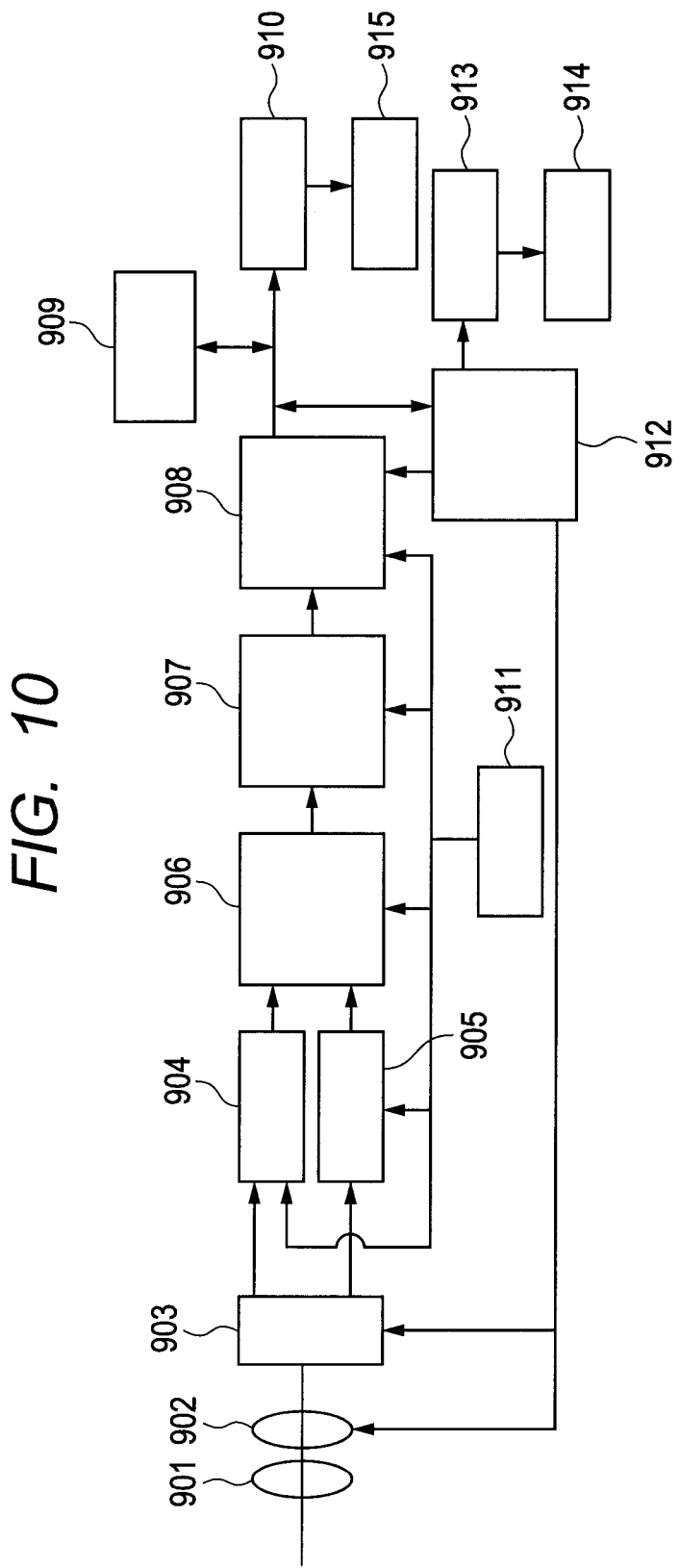
FIG. 10 is a block diagram of an imaging system according to a fourth embodiment of the present invention.

FIG. 10 is a block diagram illustrating an example of configuration of an imaging system (camera) according to a fourth embodiment of the present invention. A barrier 901 protects a lens 902. The lens 902 forms an optical image of an object on a solid-state imaging apparatus 904. An aperture 903 adjusts the amount of light passed through the lens 902. The solid-state imaging apparatus 904 acquires the optical image of the object formed by the lens 902 as an image signal. Reference numeral 905 denotes the AF sensor (focus detecting apparatus) of the third embodiment using the photoelectric conversion apparatus described in the embodiments. An analog signal processing apparatus 906 processes signals output from the solid-state imaging apparatus 904 and the AF sensor 905. An A/D converter 907 converts the signal output from the signal processing apparatus 906 from analog to digital. A digital signal processing unit 908 applies various corrections and data compression to image data output by the A/D converter 907. A memory unit 909 temporarily stores image data. An external I/F circuit 910 communicates with an external computer. A timing generation unit 911 outputs various timing signals to the digital signal processing unit 908, etc. An overall control/calculation unit 912 performs various calculations and controls the entire camera. Reference numeral 913 denotes a recording medium control I/F unit. A removable recording medium 914, such as a semiconductor memory, records or reads acquired image data. Reference numeral 915 denotes an external computer.

An operation during imaging by the imaging system will be described. The barrier 901 is opened, and the overall control/calculation unit 912 detects the phase difference to calculate the distance to the object based on the signal output from the AF sensor 905. The overall control/calculation unit 912 drives the lens 902 based on the calculation result to again determine whether the object is focused. If the object is not focused, the overall control/calculation unit 912 performs auto focus control for driving the lens 902 again. After focusing of the object is confirmed, the solid-state imaging apparatus 904 starts a charge accumulating operation. When the charge accumulating operation by the solid-state imaging apparatus 904 is finished, the A/D converter 907 converts the image signal output from the solid-state imaging apparatus 904 from analog to digital. The image signal passes through the digital signal processing unit 908, and the overall control/calculation unit 912 writes the image signal in the memory unit 909. Based on the control by the overall control/calculation unit 912, the data accumulated on the memory unit 909 is recorded in the recording medium 914 through the recording medium control I/F unit 910. The data accumulated on the memory unit 909 is also directly output to the computer 915, etc., through the external I/F unit 910.

The non-inverting amplifiers M11, M31, and M41 are used for the sensor cell unit 100 and the memory cell units 101 and 102 in the first to fourth embodiments. This can attain excellent output linearity, stable drive current, little gain variation, small circuit size, and/or excellent photo response non-uniformity.

The above-described embodiments are intended to illustrate examples for implementing the present invention and should not be construed as limiting the technical scope of the present invention. The present invention can be implemented in various forms without departing from the technical concept and main features of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-164505, filed Jul. 27, 2011, which is hereby incorporated by reference herein in its entirety.

What is claimed is:

1. A photoelectric conversion apparatus comprising:
   a sensor cell unit configured to perform a non-inverting output, via a first non-inverting amplifier to a common output line, of a signal generated according to a photoelectric conversion by a photoelectric conversion element;
   a first memory cell unit configured to hold the signal inputted from the common output line to a first memory capacitor, and to perform a non-inverting output of the signal held by the first memory capacitor, via a second non-inverting amplifier to the common output line;
   a transfer unit configured to non-inverting or inverting, via an amplifier, the signal in the common output line, and to output the non-inverted or inverted signal to the common output line;
   a transfer switch arranged between an input terminal of the transfer unit and the common output line; and
   a feedback switch arranged between an output terminal of the transfer unit and the common output line, wherein
   the sensor cell unit outputs the non-inverting output from the first non-inverting amplifier through a first switch to the common output line,
   the first memory cell unit inputs the signal from the common output line through a first memory cell write switch to the first memory capacitor, and outputs the non-inversion output from the second non-inverting amplifier through a second switch to the common output line.

2. The photoelectric conversion apparatus according to claim 1, further comprising
   a reset unit for resetting the input terminal of the transfer unit at a reference voltage.

3. The photoelectric conversion apparatus according to claim 2, wherein
   the transfer unit is clamped by the output from the sensor cell unit, and, after releasing the clamp, inputs the reference voltage, to output a fixed pattern noise of the sensor cell unit to the sensor cell unit.

4. The photoelectric conversion apparatus according to claim 2, wherein
   the transfer unit is clamped by the reference voltage, and, after releasing the clamp, inputs the output from the sensor cell unit, to output a reset noise of the sensor cell unit to the first memory cell unit.

5. The photoelectric conversion apparatus according to claim 2, wherein
   the transfer unit is clamped by the output from the sensor cell unit, and, after releasing the clamp, inputs the reference voltage, to output an output voltage from the sensor cell unit to a monitor unit.

6. The photoelectric conversion apparatus according to claim 1, wherein
   the transfer unit is clamped by the output from the first memory cell unit, and, after releasing the clamp, inputs the output from the sensor cell unit, to output, to the first memory cell unit, a voltage derived by removing a reset noise held in the first memory cell unit from the output voltage from the sensor cell unit.

7. The photoelectric conversion apparatus according to claim 2, wherein
   the transfer unit has a differential amplifier.

8. The photoelectric conversion apparatus according to claim 7, wherein
   the transfer unit is clamped by the reference voltage, and, after releasing the clamp, inputs the output from the sensor cell unit, to output a fixed pattern noise of the sensor cell unit to the sensor cell unit.

9. The photoelectric conversion apparatus according to claim 7, wherein
   the transfer unit is clamped by the output from the sensor cell unit, and, after releasing the clamp, inputs the reference voltage, to output a reset noise of the sensor cell unit to the first memory cell unit.

10. The photoelectric conversion apparatus according to claim 7, wherein
    the transfer unit is clamped by the reference voltage, and, after releasing the clamp, inputs the output from the sensor cell unit, to output an output voltage from the sensor cell unit to monitor unit.

11. The photoelectric conversion apparatus according to claim 7, wherein
    the transfer unit is clamped by the output from the sensor cell unit, and, after releasing the clamp, inputs the output from the first memory cell unit, to output, to the first memory unit, a voltage derived by removing from the output voltage from the sensor cell unit a reset noise held by the first memory cell unit.

12. A focus detecting apparatus comprising
    the photoelectric conversion apparatus according to claim 1.

13. An imaging system comprising
    the focus detecting apparatus according to claim 12.

* * * * *